Oct. 29, 1968  C. W. MOSSBERG  3,407,860
SAFETY SPIKE FOR VEHICLE TIRES
Filed Feb. 23, 1966
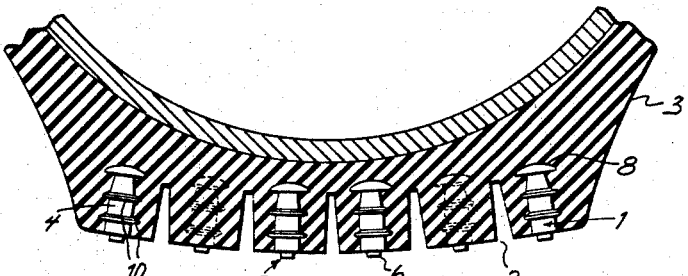
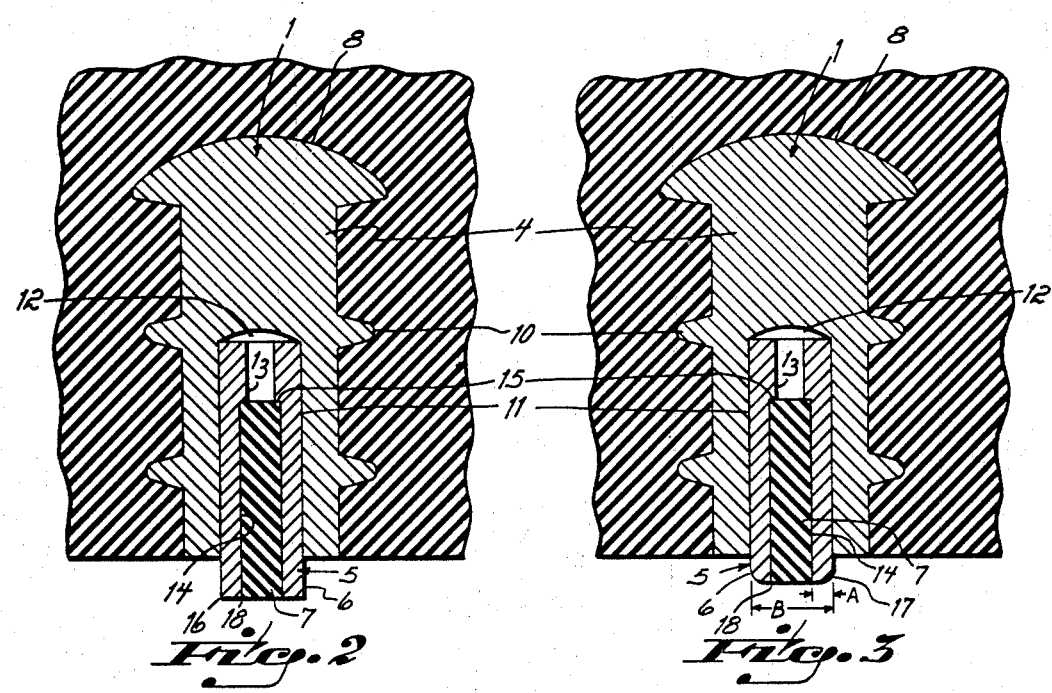
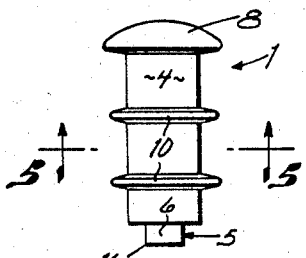
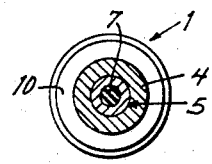
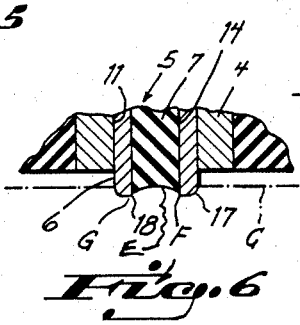
INVENTOR.
Coral W. Mossberg
BY
Wood, Herron & Evans
ATTORNEYS

United States Patent Office 3,407,860
Patented Oct. 29, 1968

3,407,860
SAFETY SPIKE FOR VEHICLE TIRES
Coral W. Mossberg, R.F.D. 4, Cumberland, Wis. 54829
Filed Feb. 23, 1966, Ser. No. 532,049
2 Claims. (Cl. 152—210)

ABSTRACT OF THE DISCLOSURE

The invention essentially comprises a safety spike assembly for the tread of a rubber vehicle tire to provide a tractive and anti-skid action when driving upon ice-covered roadway surfaces. In general, the spike assembly comprises a holder formed of metal having a internal bore, and a stud formed of tubular metal interfitted in the bore of the holder and projecting beyond the outer end of the holder, the bore of the tubular stud providing an internal cutting edge adapted to provide purchase with the icy road surface. In order to prevent excessive wear, the tubular steel stud may be formed of carbide, or other hard material which has long wearing qualities. The outer end of the tubular stud is blocked off by a plug formed of rubber, or other resilient material, thereby to prevent the bore from becoming plugged with sand, pebbles and other materials which may otherwise pack into the bore and impair the tractive effect. During operation, the outer end portion of the resilient plug is compressed to a concave shape in response to pressure exerted upon the tire against the roadway surface, thus exposing the sharp internal cutting edge to the icy road surface to provide the tractive action.

---

This invention relates to safety spikes for vehicle tires, in which the safety spike is embedded in the rubber tread of the tire and includes an end portion which projects outwardly beyond the surface of the tread to impart a tractive and anti-skid effect. Tires provided with safety spikes of this type are intended particularly for use on snow or ice-covered roadway surfaces, the projecting end portion of the spike being relatively small in area in relation to the weight load and consequently being adapted to penetrate the icy surface to provide the tractive and anti-skid action.

Under ordinary use, a given percentage of driving with tires equipped with the safety spikes is carried out on roads which are devoid of ice and snow, and as a consequence, the end of the spike acts upon the abrasive surface of the bare roadway and is subjected to excessive wear.

In the use of spikes of solid construction, the outer projecting end wears to a rounded shape as a result of being driven upon the roadway surface. Upon being rounded, the solid spike loses a high percentage of its tractive and anti-skidding action, since the rounded end has no sharp edge for purchase with the icy roadway surface, even if it does penetrate.

It has been one of the primary objectives of the present invention to provide a spike having a road-engaging stud which is of tubular construction, thus providing an internal bore, the edge of which bore presents a sharp corner or cutting edge to the icy road surface to provide the necessary tractive and anti-skid action in spite of abrasive action and rounding to which the stud may have been subjected in being driven on the bare roadway surface.

According to this concept, the tubular stud is fabricated from hard metal and the exterior corner, or edge, which is delineated by the outside diameter of the tubular stud (when the stud is new) may become worn and rounded, due to sustained abrasive action on the bare roadway surface. However, the inner corner or cutting edge, which is delineated by the internal bore of the tubular stud, remains sharp in spite of this wear. By virtue of this construction, the wall thickness of the tubular stud protects its inner edge which is delineated by the interial bore, as a consequence, the inside diameter of the stud presents a sharp cutting edge to the icy surface.

A further objective of the invention has been to provide a tubular stud in which the interial bore is blocked off by a resilient plug formed of rubber or a similar material to prevent the bore from becoming clogged with sand, pebbles and abrasive materials which may pack into the bore, and which would otherwise impair the tractive effect.

According to this aspect of the invention, the outer end portion of the resilient plug is compressed to a concave shape, in response to the penetration of the stud under the concentrated pressure exerted when the tire is being driven upon an icy surface. This action exposes the sharp internal edge of the cylindrical spike to the icy surface to preserve the cutting and tractive action.

A further objective of the invention has been to provide a tubular stud having a wall thickness sufficiently great in relation to the diameter of the stud to withstand, without distortion or failure, the forces which act upon the end portion of the spike on application of the brakes or upon acceleration.

In the present example, the wall thickness is equal to approximately one-fourth the total diameter of the stud. It has been found that this relationship provides the best penetration of the stud into the icy road surface and also sufficient strength to withstand the forces developed without distortion or failure of the tubular stud. This relationship naturally may be varied in accordance with the type of material employed.

The various features and advantages of the invention will be more fully apparent to those skilled in the art from the following detailed description taken in conjunction with the drawings.

In the drawings:

FIGURE 1 is a fragmentary cross-sectional view through a typical vehicle tire, showing the general arrangement of the safety spikes of this invention which are embedded or molded into the rubber tread of the tire.

FIGURE 2 is an enlarged fragmentary view of a portion of the tire tread, detailing the safety spike in relation to the tread.

FIGURE 3 is an enlarged sectional view similar to FIGURE 2, showing the worn end portion of the safety spike after it has been exposed to prolonged road service.

FIGURE 4 is a side elevational view of one of the safety spikes before installation in the tire tread.

FIGURE 5 is a cross-sectional view taken along line 5—5 of FIGURE 4, further detailing the construction of the safety spike.

FIGURE 6 is a diagrammatic view, similar to FIGURE 3, showing the action of one of the safety spikes with reference to an icy surface.

Described generally with reference to FIGURE 1, the safety spike of this invention, indicated generally at 1, is shown embedded in the tread 2 of a vehicle tire 3. The tread 2 is conventional and may be formed of rubber or one of the resilient plastic compositions presently in use. As indicated in FIGURE 1, the safety spikes 1 preferably are molded into the tire tread in the form of rows extending transversely of the tread and about its periphery. As indicated in broken lines in this view, the safety spikes 1 of each transverse row, may be staggered with reference to one another in the rows to increase the tractive and anti-skid action.

Described with reference to FIGURES 2 and 3, each safety spike 1 comprises a holder 4 which is preferably formed of metal, such as aluminum, although other materials, such as a hard plastic material, may be used. Each holder 4 includes a tubular insert or stud 5, having an end portion 6 which projects outwardly beyond the surface of the tread 2, and beyond the end of the holder 4, for road engagement. The bore of the tubular stud 5 includes a plug 7, formed of a soft material, such as rubber, to prevent clogging of the bore of stud 5 and consequent impairment of the tractive and anti-skid action, as explained later.

Described in detail, the holder 4 is in the form of a cylindrical shank, formed of aluminum or of a hard plastic composition, as noted above, and having a head portion 8 and a pair of flanges 10—10 to provide anchorage with the tire tread 2. The holder 4 is molded into the tire tread 2 when the tire is manufactured, and the external surface of each holder may be treated to increase adhesion to the rubber. In the present example, the outer end of the holder 4 is flush with the surface of the tire tread. The holder 4 includes a bore 11 for the reception of the stud 5 (FIGURES 2 and 3).

The stud 5 may be fabricated from seamless steel tubing formed of carbide, high speed steel, cobalt, Stellite or other long wearing alloys. In the example disclosed herein, the stud 5 has an outside diameter establishing a press fit with reference to the bore 11 of holder 4, with the inner end of the stud 5 seated against the blind end 12 of bore 11. The stud 5 includes an internal bore 13, which, in the present example, has been machined from its outer end to provide an enlarged counterbore 14 to receive the plug 7. In this example, the resilient plug 7 seats against a shoulder 15 which is formed at the juncture of the bores 13 and 14. If the counterbore 14 is omitted, then the inner end of the resilient plug seats against the blind end 12 of the holder bore 11.

The resilient plug 7 provides a friction fit with the counterbore 14 and the plug is preferably inserted into the bore of the stud 5 prior to insertion of the stud into the holder 4. As noted above, the resilient plug 7 thus seals off the bore 14 of the stud to prevent foreign materials such as sand, pebbles and the like from plugging the bore while driving upon roadway surfaces which are now snow or ice covered.

As long as the tire is driven upon roadway surfaces covered with ice or snow, there is practically no wearing of the studs 5. However, during the winter season, there are periods when the roads are clear of ice and snow; hence, the studs 5 are subjected, from time to time, to the abrasive action of the bare roadway surface. Obviously, it is not feasible to switch back to standard tires each time a thaw occurs. In the case of a solid stud, the outer end will wear to a generally spherical shape after moderate service on clear roadway surfaces, detracting from its tractive and anti-skid action with reference to an icy surface.

In the present structure, by virtue of the tubular shape of the stud 5, the tractive and anti-skid action of the stud is preserved, in spite of wear and rounding of the end of the stud. Thus, as shown in FIGURE 2, the external cylindrical corner 16 of the stud 5 presents a sharp edge to the roadway surface initially. However, after the end of the stud becomes worn, the exterior edge or corner 16 becomes rounded as at 17 (FIGURE 3), even though the stud is formed of hard material.

However, the juncture of the outer end of the stud 5 with its internal bore 14, delineates a sharp internal cutting edge 18. The internal edge 18 is thus presented to the road surface to provide the tractive and anti-skid effect, even though the external edge 16 becomes rounded. It will be understood, that the internal edge 18 remains sharp at all times, since it is not directly exposed to the rolling action of the tire as is the external edge 16. It will also be understood that the end of the resilient plug 7 wears down with the hardened end of the stud 5 to keep the gripping power of the inner edge at maximum.

In the present example, as indicated in FIGURE 3, the wall thickness A of the stud 5 is equal to approximately one-fourth the total diameter B of the stud, in order to provide the strength to resist the anti-skid forces without the possibility of breaking or distorting the end portion of the stud. These proportions may be varied in accordance with the properties of the material. It will be understood that the tractive or anti-skid forces acting upon the end portion 6 of the stud 5 are transmitted to and resisted by the holder 4, in which the stud is seated.

The tractive and anti-skid action of the stud 5 is shown diagrammatically in FIGURE 6. As shown in this view, the end portion 6 of the stud is worn to form the exterior rounded edge 17, with the end of the stud bearing against and partially penetrating the ice-covered surface C of the roadway. If the brakes of the vehicle are applied, the tendency of the vehicle is to continue in the direction indicated by the arrow D. Assuming that the stud 5 is of solid construction, then the spherical end would be presented to the icy surface C with a loss of traction, due to the rounded external edge 17. However, by virtue of the cylindrical construction of the stud 5 and its relatively small area, combined with the resilient plug 7, the end of the stud 5 will penetrate the icy surface, causing the end of the rubber plug to be deformed to the concave shape, indicated diagrammatically at E, thus bringing the internal cutting edge 18, on the trailing side of the plug, into cutting engagement with the surface C to provide the anti-skidding or tractive effect, as the case may be. In other words, with a sliding force acting in the direction of arrow D, then the curved cutting edge 18, indicated at F will become active, whereas if the force is acting in the opposite direction, then the cutting edge indicated at G will become effective.

Accordingly, by virtue of the cylindrical studs 5, combined with the resilient plug 7, the studs are long-lived and provide the anti-skidding, tractive, and gripping effect as long as the end portion 6 of the stud 5 projects beyond the end of the holder 4, since the internal edges 18 of the studs are protected against wear.

What I claim is:

1. A safety spike assembly for the tread of a vehicle tire adapted for service upon an icy roadway surface, said safety spike assembly comprising:
   a holder formed of metal and having an internal bore extending inwardly from the outer end thereof, the bore having a blind inner end;
   said holder having an external cylindrical shank of uniform diameter and including a head portion at the inner end thereof, said shank having a plurality of external flanges formed along the length of the shank and spaced apart from one another;
   said holder being imbedded in the tread of the tire with the outer end thereof flush with the surface of the tread;
   a cylindrical stud formed of metal of tubular form, said stud having an internal bore including an enlarged counterbore extending inwardly from the outer end of the stud and delineating a shoulder within the stud;
   said stud being press fitted into the internal bore of the said holder and having an inner end seated against the blind inner end of the bore of the holder, the stud having an outer end portion projecting outwardly beyond the outer end of the holder and beyond the surface of the tread;
   the counterbore of the tubular stud providing an internal cutting edge which is presented at the outer end of the stud which projects from the holder;
   a plug formed of incompressible resilient material interfitting the counterbore of the tubular stud and having an inner end seated against the shoulder delineated by the counterbore, thereby to prevent material from being packed into the counterbore of the stud during road transport;
   said resilient plug having sufficient yieldability to flow inwardly from the counterbore portion of the stud, with the inner portion of the plug displaced inwardly from the shoulder delineated by the counterbore and into the bore at the inner end of the stud in response to pressure engagement of the outer end of the stud against an icy roadway surface;

the stud thereby presenting the internal cutting edge which is delineated by the internal bore of the stud to the icy surface for purchase therewith and traction.

2. A safety spike assembly for the tread of a vehicle tire adapted for service upon an icy roadway surface, said safety spike assembly comprising:

a holder formed of metal and having an internal bore extending inwardly from the outer end thereof, said bore having a blind inner end;

said holder having an external cylindrical shank of uniform diameter and including a head portion at the inner end thereof, said shank having a plurality of external flanges formed along the length of the shank and spaced apart from one another;

said holder being imbedded in the tread of the tire with the outer end thereof flush with the surface of the tread;

a cylindrical stud formed of metal of tubular form, said stud having an internal bore including an enlarged counterbore extending inwardly from the outer end of the stud and delineating a shoulder located within the stud at a point at least one-half the total length of the stud;

said stud being press fitted into the internal bore of the said holder and having an inner end seated against the blind end of the bore of the holder, the stud having an outer end portion projecting beyond the outer end of the holder and beyond the surface of the tread;

the counterbore of the tubular stud providing an internal cutting edge which is presented at the outer end of the stud which projects outwardly from the holder;

a plug formed of incompressible resilient material interfitting the counterbore of the tubular stud and having an inner end seated against the shoulder which is delineated by the counterbore, thereby to prevent material from being packed into the counterbore of the stud during road transport;

the stud having a wall thickness in relation to the outside diameter of the stud which is equal to at least one-fourth the outside diameter of the stud, said wall thickness being sufficient to resist the forces which act upon the projecting end portion of the stud during road transport;

said resilient plug having sufficient yieldability to flow inwardly from the counterbore portion of the stud, with the inner portion of the plug displaced inwardly from the shoulder delineated by the counterbore and into the bore at the inner end of the stud in response to pressure engagement of the outer end of the stud against an icy roadway surface;

the stud thereby presenting the internal cutting edge which is delineated by the internal bore of the stud to the icy surface for purchase therewith and traction.

References Cited
UNITED STATES PATENTS

| 3,179,147 | 4/1965 | Edsmar | 152—210 |
| 2,627,888 | 2/1953 | Bull | 152—210 |

FOREIGN PATENTS 26,699  10/1907  Great Britain.

ARTHUR L. LA POINT, *Primary Examiner.*

S. T. KRAWCZEWICZ, *Assistant Examiner.*